(12) United States Patent
Ono

(10) Patent No.: US 8,411,539 B2
(45) Date of Patent: Apr. 2, 2013

(54) OPTICAL DISC RECORDING DEVICE

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/547,214

(22) Filed: Jul. 12, 2012

(65) Prior Publication Data

US 2013/0021886 A1   Jan. 24, 2013

(30) Foreign Application Priority Data

Jul. 20, 2011 (JP) ................................. 2011-158597

(51) Int. Cl.
*G11B 7/00* (2006.01)
(52) U.S. Cl. ....................................... 369/47.53; 369/94
(58) Field of Classification Search .......................... None
See application file for complete search history.

(56) References Cited

U.S. PATENT DOCUMENTS

| 7,885,171 | B2 * | 2/2011 | Shoji et al. ................. 369/47.53 |
| 2006/0291352 | A1 | 12/2006 | Murakami et al. |
| 2008/0117750 | A1 | 5/2008 | Hayashi |

FOREIGN PATENT DOCUMENTS

| JP | 2007-035237 | 2/2007 |
| JP | 2008-130138 | 6/2008 |
| JP | 2009-043297 | 2/2009 |
| JP | 2010-129155 | 6/2010 |

\* cited by examiner

*Primary Examiner* — Wayne Young
*Assistant Examiner* — Brian Butcher
(74) *Attorney, Agent, or Firm* — Morgan, Lewis & Bockius LLP

(57) ABSTRACT

An optical disc recording device, wherein, during an OPC process addressing a write-once optical disc provided with only one or two recording layers, a recording power value of an optical pickup is changed within a range from (100−A) % of a reference recording power value to (100+B) % of the reference recording power value, and wherein, during an OPC process addressing a write-once optical disc provided with three or more recording layers of the same type as the aforementioned write-once optical disc, the recording power value of the optical pickup is changed within a range from (100−C) % of a reference recording power value to (100+D) % of the reference recording power value, D being set to be less than B.

8 Claims, 2 Drawing Sheets

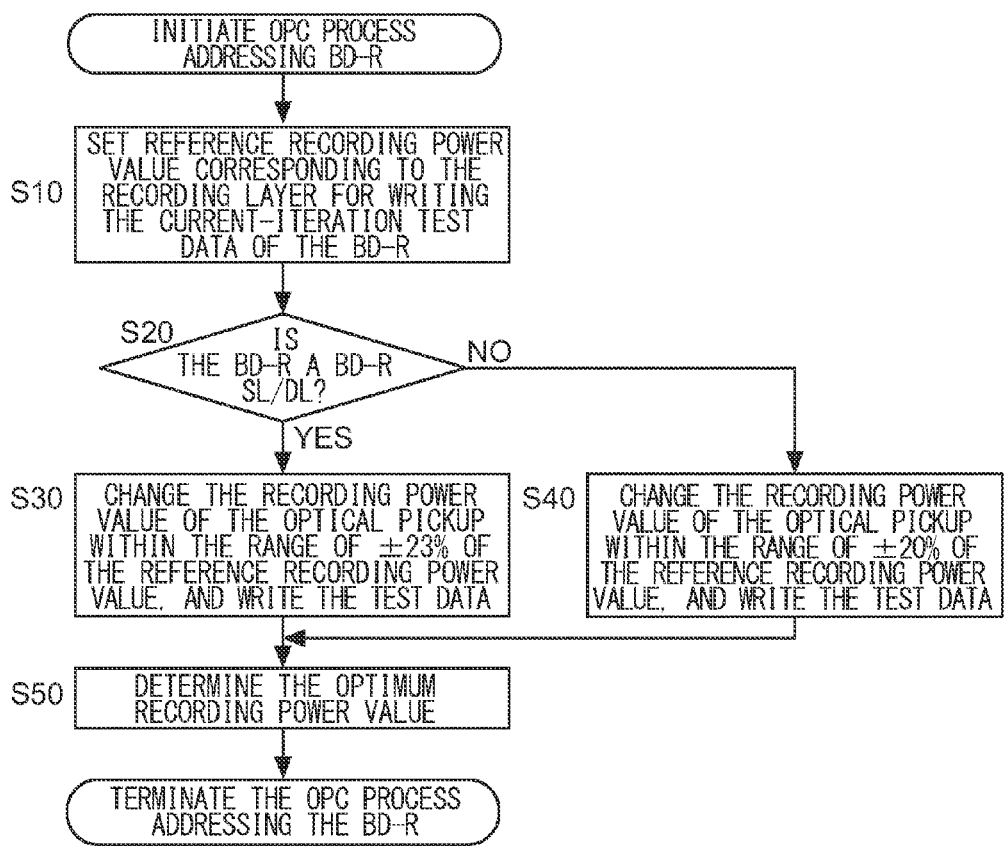

OPTICAL DISC RECORDING DEVICE

This nonprovisional application claims priority under 35 U.S.C. §119(a) on Patent Application No. 2011-158597 filed in Japan on Jul. 20, 2011, the entire contents of which are hereby incorporated by reference.

BACKGROUND OF THE INVENTION

1. Field of the Invention

The present invention relates to an optical disc recording device for recording information onto a writable optical disc.

2. Description of Related Art

In recent years, Compact Discs (CDs), Digital Versatile Discs (DVDs), Blu-ray Discs™ (BDs), and a variety of other types of optical discs have become increasingly widespread. One currently existing form of optical disc provided with three or more recording layers is a BD that conforms to the BDXL standard instituted in June 2010.

Because the BDXL standard represents expanded use of a BD, an optical disc recording device able to support a BD conforming to the BDXL standard typically adopts a configuration in which backward compatibility is ensured, i.e., a configuration in which support can also be provided for a BD provided with only one or two recording layers.

In a case where an optical disc recording device records onto an optical disc, there arise differences in the sensitivity of the recording layer, in the temperature of the recording layer, in the recording speed, and the like; therefore, it is not possible to consistently record data at a fixed level of quality when writing has been performed at a pre-established laser power.

In view whereof, when data has been recorded in the past, test data has been written at varying levels of recording power onto a test region provided to an inner peripheral part of an optical disc, and the test data written onto the test region is played back to evaluate the properties of the playback signal, whereby an optimum power control (OPC) process for determining the optimum laser power is performed; thereafter, the optimum laser power is used to record data.

However, with respect to an OPC process addressing a write-once BD provided with three or four recording layers conforming to the BDXL standard (BD-R TL/QL) in an optical disc recording device which is able to provide support for a BD conforming to the BDXL standard and in which backward compatibility has been ensured, a concern is presented in that a tracking servo failure may occur during OPC process addressing a write-once BD provided with three or four layers conforming to the BDXL standard (a BD-R TL/QL) if only conventional OPC process is followed; i.e., OPC process addressing a write-once BD provided with only one or two recording layers (BD-R SL/DL).

JP-A 2010-129155 discloses an optical disc drive capable of determining an optimum recording power in consideration of the variance in the OPC and of the inter power over write (IPOW) properties, but does not suggest any disclosure of a measure for resolving the problem of a tracking servo failure occurring during OPC process addressing a write-once optical disc provided with three or more recording layers.

JP-A 2008-130138 discloses an optical disc recording device able to rapidly perform an OPC operation on a writable optical disc and to determine a suitable recording power for both a recorded region and an unrecorded region, but does not suggest any disclosure of a measure for resolving the problem of a tracking servo failure occurring during OPC process addressing a write-once optical disc provided with three or more recording layers.

JP-A 2009-43297 discloses an optical disc device for changing the recording power for recording onto an optical disc medium in broad increments to acquire amplitude information and thereafter changing the recording power in fine increments within a region where the recording power is low to acquire amplitude information, thereby lowering the variance in optimum recording power extracted from the amplitude information on data enumerated in a power calibration area (PCA) region, thus making it possible to achieve stabilized recording; but does not suggest any disclosure of a measure for resolving the problem of a tracking servo failure occurring during OPC process addressing a write-once optical disc provided with three or more recording layers.

JP-A 2007-35237 discloses an optical disc recording control device for computing an optimum recording power on the basis of a study of the OPC at an inner peripheral site and outer peripheral site of an optical disc, prior to processing for recording data onto the optical disc, so as to be able to record at an optimum recording laser power in accordance with the properties of the optical disc, even in a case where there is variance in the properties within the surface of the optical disc; but does not suggest any disclosure of a measure for resolving the problem of a tracking servo failure occurring during OPC process addressing a write-once optical disc provided with three or more recording layers.

SUMMARY OF THE INVENTION

The purpose of the present invention is to provide an optical disc recording device able to suppress the occurrence of a tracking servo failure during OPC process addressing a write-once optical disc provided with three or more recording layers.

In order to achieve the foregoing purpose, an optical disc recording device according to the present invention is provided with:

an optical pickup for irradiating an optical disc with light and for using a photodetector to detect return light from the optical disc; and a determination unit for changing a recording power value of the optical pickup and writing test data onto a test region of the optical disc to determine an optimum recording power for the optical pickup.

In a case where the optical disc having been mounted in the optical disc recording device is a write-once optical disc provided with only one or two recording layers for playing back or recording information by being irradiated with a laser beam of a specific wavelength band, the determination unit changes the recording power value of the optical pickup within a range from (100−A) % of the reference recording power value corresponding to a recording layer for writing the test data of the optical disc having been mounted in the optical disc recording device, to (100+B) % of the reference recording power value corresponding to the recording layer for writing the test data of the optical disc having been mounted in the optical disc recording device.

In a case where the optical disc having been mounted in the optical disc recording device is a write-once optical disc provided with three or more recording layers for playing back or recording information by being irradiated with a laser beam of a specific wavelength band, the determination unit changes the recording power value of the optical pickup within a range from (100−C) % of the reference recording power value corresponding to the recording layer for writing the test data of the optical disc having been mounted in the optical disc recording device, to (100+D) % of the reference recording power value corresponding to the recording layer for writing the test data of the optical disc having been mounted in the optical disc recording device.

A, B, C, D are all set to values greater than 0 and less than 100, D being set to be lower than B.

A may be set to a different value, and B may be set to a different value, for a write-once optical disc provided with only one recording layer versus an write-one optical disc provided with only two recording layers. With a write-once optical disc provided with three or more recording layers, C may be set to a different value in accordance with the number of recording layers, and D may be set to a different number in accordance with the number of recording layers.

The determination unit may also refer to disc information, pre-recorded onto the optical disc having been mounted in the optical disc recording device, when setting the reference recording power value corresponding to the recording layer for writing the test data of the optical disc mounted in the optical disc recording device.

The determination unit may set A and B to be the same, and may set C and D to be the same.

The write-once optical disc provided with only one or two recording layers for playing back or recording information by being irradiated with a laser beam of the specific wavelength band may be a BD, and the write-once optical disc provided with three or more recording layers for playing back or recording information by being irradiated with a laser beam of the specific wavelength band may be a BD conforming to the BDXL standard.

BRIEF DESCRIPTION OF THE DRAWINGS

FIG. 2 is a flow chart for illustrating OPC process addressing a write-once BD as performed by the optical disc recording device according to the embodiment of the present invention illustrated in FIG. 1.

DETAILED DESCRIPTION OF PREFERRED EMBODIMENTS

Figure 1:
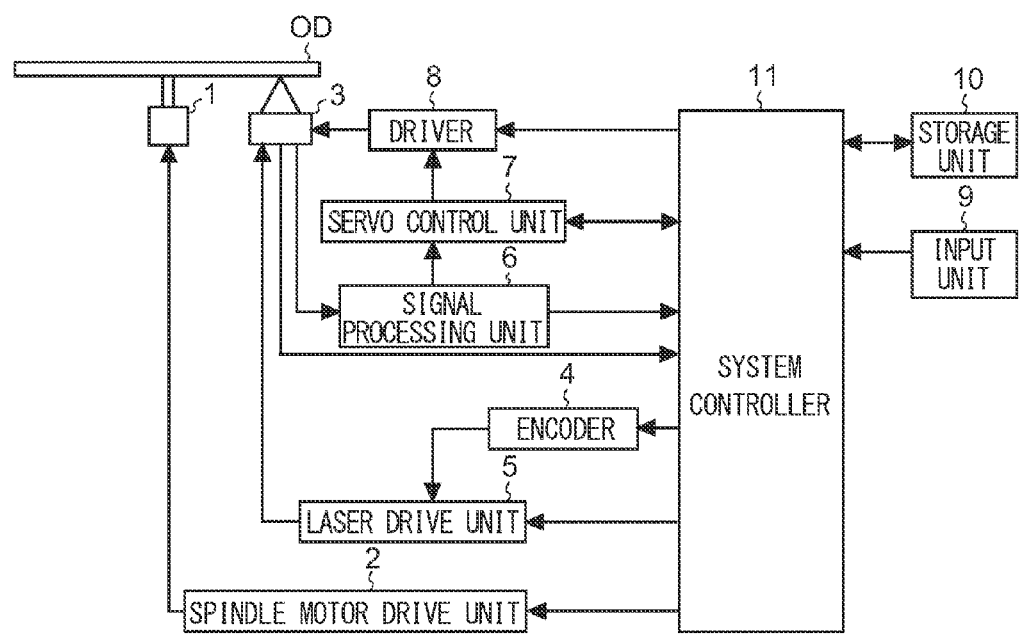
FIG. 1 is a drawing illustrating an example of a schematic configuration of an optical disc recording device according to the present invention.

The following is a description of an embodiment of the present invention, with reference to the accompanying drawings. FIG. 1 illustrates a schematic configuration of an optical disc recording device according to an embodiment of the present invention.

The optical disc recording device according to the embodiment of the present invention illustrated in FIG. 1 is a device able to write information onto a writable optical disc OD of a format such as CD-R/RW, DVD-R/RW, DVD+R/RW, DVD-RAM, or BD-R/RE, the device being provided with a spindle motor 1, a spindle motor drive unit 2, an optical pickup 3, an encoder 4, a laser drive unit 5, a signal processing unit 6, a servo control unit 7, a driver 8, an input unit 9, a storage unit 10, and a system controller 11. The optical disc recording device according to the embodiment of the present invention illustrated in FIG. 1 also has a playback function in addition to the recording function.

The spindle motor 1 has an output shaft linked to a turntable (not shown). The turntable is able to detachably hold the optical disc OD. This makes it possible to cause the spindle motor 1 to rotate and thereby cause the optical disc OD to rotate.

The spindle motor 1 is connected to the spindle motor drive unit 2. The drive of the spindle motor 1 is controlled by the spindle motor drive unit 2 under the management of the system controller 11.

The optical pickup 3 is provided with a semiconductor laser light source (not shown) for emitting laser light of a predetermined wavelength, an objective lens (not shown) for focusing the laser light emitted from the semiconductor laser light source onto a recording layer of the optical disc OD, and a photodetector (not shown) for receiving and photoelectrically converting the laser light reflected by the optical disc OD. Further, moving means (not shown) makes it possible for the optical pickup 3 to be moved in a direction parallel to a radial direction of the optical disc OD (the left-right direction in FIG. 1).

Using the spindle motor 1 to cause the optical disc OD to rotate and cause the position of the optical pickup 3 to move as appropriate makes it possible to move a spot position of the laser light emitted from the optical pickup 3 to the whole area of a recordable region of the optical disc OD. It is accordingly possible to use the optical pickup 3 to record information on all of the recordable region of the optical disc OD.

As described above, the optical disc recording device according to the embodiment of the present invention illustrated in FIG. 1 provides support for CD-, DVD-, and BD-format optical discs. For this reason, the semiconductor laser light source is constituted, for example, of a two-wavelength integrated laser diode (LD) able to emit an infrared laser beam in a 780-nm wavelength band (a laser beam for a CD) as well as a red laser beam in a 650-nm wavelength band (a laser beam for a DVD), and of an LD able to emit a blue laser beam in a 405-nm band (a laser beam for a BD).

An objective lens actuator (not shown) makes it possible for the objective lens provided to the optical pickup 3 to be moved in a focusing direction, which is a direction parallel to an optical axis direction (the up-down direction in FIG. 1), and in a tracking direction, which is a direction parallel to the radial direction of the optical disc OD (the left-right direction in FIG. 1). This is in order to make it possible to perform a focusing control for performing a control such that the objective lens is always positioned so as to be focused on the recording layer of the optical disc OD, and a tracking control for performing a control such that the position of a beam spot, having been focused by the objective lens, always follows a track formed on the optical disc OD.

The moving means for causing the optical pickup 3 is constituted, for example, of a sliding motor (not shown) disposed at a fixed portion, a pinion (not shown) caused to rotate by the rotation of the sliding motor, and a rack (not shown) attached to a main body of the optical pickup 3. According to such a configuration, the relationship between the rack and the pinion is used to achieve movement of the optical pickup 3.

The encoder 4 performs encoding processing in a predetermined format with respect to information supplied from the system controller 11, creates a recording pulse on the basis of the encoded information, and outputs the recording pulse to the laser drive unit 5. The laser drive unit 5 causes the semiconductor laser light source of the optical pickup 3 to oscillate in conformity with the recording pulse outputted from the encoder 4. The laser drive unit 5 also has a function for switching the wavelength of the laser light emitted from the semiconductor laser light source of the optical pickup 3, depending on the type of the optical disc OD. The laser drive unit 5 alters an electric drive current supplied to the semiconductor laser light source to achieve an alteration in a recording power value of the optical pickup 3.

The signal processing unit 6 performs processing for computing an electrical signal outputted from the photodetector provided to the optical pickup 3, the photodetector being divided into a plurality of regions, and generates a focusing error signal, a tracking error signal, and a wobble signal. These signals are dispatched to the servo control unit 7. The signal processing unit 6 adds all of the electrical signals outputted from each of the divided regions of the photodetector provided to the optical pickup 3, generates an RF signal, and sends the RF signal to an A/D conversion input port (not shown) of the system controller 11.

The servo control unit 7 uses the focusing error signal and the tracking error signal dispatched from the signal processing unit 6 to perform the focusing control and the tracking control, via the driver 8. The servo control unit 7 has control with respect to the movement of the optical pickup 3 in the direction parallel to the radial direction of the optical disc OD, via the driver 8. The servo control unit 7 also has a function for generating an address in a case where an address signal is included in the wobble.

The driver 8 is a circuit for causing the objective lens actuator and the moving means for moving the optical pickup 3 to drive in conformity with an instruction from the servo control unit 7.

The input unit 9 is composed, for example, of a plurality of input buttons (not shown) and/or a receiving unit (not shown) for receiving a remote control signal transmitted from a remote control transmitter; the input unit 9 inputs the content of an instruction from a user and sends the content of the instruction to the system controller 11.

The storage unit 10 stores various different programs and/or forms of data, and also functions as a temporary storage memory or as a working memory used by the system controller 11.

The system controller 11 executes control processing as appropriate in accordance with a requisite operation requiring execution by each of the parts constituting the optical disc recording device according to the embodiment of the present invention illustrated in FIG. 1.

In the optical disc recording device according to the embodiment of the present invention illustrated in FIG. 1, upon insertion of the optical disc OD, the spindle motor 1 causes the optical disc OD to rotate slightly and drives the optical pickup 3, and performs a "mount" process, which is a process for reading out disc information (DI) from the optical disc OD.

A description of OPC process addressing a write-once BD as performed by the optical disc recording device according to the embodiment of the present invention illustrated in FIG. 1 shall now be provided, with reference to the flow chart illustrated in FIG. 2.

In a case where the optical disc OD is a write-once BD, the optical disc recording device according to the embodiment of the present invention illustrated in FIG. 1 initiates the operation of the flow chart illustrated in FIG. 2 when the system controller 11 receives a write command.

Firstly, in step S10, the system controller 11 sets a reference recording power value corresponding to a recording layer for writing the current iteration of test data of the optical disc OD (the write-once BD). The storage unit 10 has pre-stored the reference recording power value for every type of optical disc. With regard to a multi-layer optical disc, in some cases one reference recording power value has been established to be shared among each of the layers, and in other cases a separate reference recording power value has been established for every layer. The system controller 11 refers to the disc information, having already been read out by the mount process, to correct as appropriate the reference recording power value corresponding to the recording layer for writing the current-iteration test data of the optical disc OD (the write-once BD) and set the reference recording power value corresponding to the recording layer for writing the current-iteration test data of the optical disc OD (the write-once BD).

In step S20, which follows step S10, the system controller 11 makes a decision as to whether the optical disc OD (the write-once BD) is a write-once BD provided with only one or two recording layers (a BD-R SL/DL) or is a write-once BD provided with three or four recording layers conforming to the BDXL standard (a BD-R TL/QL), on the basis of information relating to the type of disc and information relating to the number of recording layers included in the disc information having already been read out by the mount processing. In actuality, because the system controller 11 ascertains the type of disc and the number of recording layers during the mounting process, it is not that a decision is made anew in step S20, but rather that the result ascertained during the mount process is used in step S20.

When the optical disc OD (the write-once BD) is a write-once BD provided with only one recording layer (a BD-R SL) or a write-once BD provided with only two recording layers (a BD-R DL) ("YES" in step S20), the system controller 11 controls the driver 8 and the laser drive unit 5 and causes a light spot to be swept in a test-data-writing direction from a terminus of a recorded region of the test region of the optical disc OD (the write-once BD). The system controller 11 also changes the recording power value of the optical pickup 3 within a range from (100−23) % of the reference recording power value corresponding to the recording layer for writing the current-iteration test data of the optical disc OD (the write-once BD), to (100+23) % of the reference recording power value corresponding to the recording layer for writing the current-iteration test data of the optical disc OD (the write-once BD), and writes the test data onto the test region of the optical disc OD (the write-once BD) (step S30).

On the other hand, when the optical disc OD (the write-once BD) is a write-once BD provided with three recording layers (a BD-R TL) or a write-once BD provided with four recording layers (a BD-R QL) ("NO" in step S20), the system controller 11 controls the driver 8 and the laser drive unit 5 and causes a light spot to be swiped in an test-data-writing direction from a terminus of a recorded region of the test region of the optical disc OD (the write-once BD). The system controller 11 also changes the recording power value of the optical pickup 3 within a range from (100−20) % of the reference recording power value corresponding to the recording layer for writing the current-iteration test data of the optical disc OD (the write-once BD), to (100+20) % of the reference recording power value corresponding to the recording layer for writing the current-iteration test data of the optical disc OD (the write-once BD), and writes the test data onto the test region of the optical disc OD (the write-once BD) (step S40).

When the processing in step S30 or in step S40 is terminated, the system controller 11 plays back the test data written onto the test region of the optical disc OD (the write-once BD), evaluates the properties (for example, the jitter properties) of the playback signal (the RF signal outputted from the signal processing unit 6), determines an optimum recording power value for the optical pickup 3 on the basis of the evaluation result (step S50), and terminates the OPC process addressing the write-once BD.

In a case where the optical disc OD is a write-once BD provided with three or four recording layers conforming to the BDXL standard (a BD-R TL/QL), the operation as described above applies a restriction to the upper limit of the recording power value of the optical pickup 3 during the OPC process as compared to the case where the optical disc OD is a write-once BD provided with only one or two recording layers (a BD-R SL/DL). Accordingly, in the case where the optical disc OD is a write-once BD provided with three or four recording layers conforming to the BDXL standard (a BD-R TL/QL), it is possible to suppress collapse of the track (groove) at points where the test data is written at a high recording power, and to suppress the occurrence of a tracking servo failure.

The values ±23% used in step S30 and ±20% used in step S40 are illustrative examples only; any appropriate value may be set in accordance with the specification of the optical disc recording device or the like. In the present embodiment, the value of ±20% is used in step S40 because in an optical disc recording device of a certain specification, the track (groove) is more prone to collapse and a tracking servo failure is more prone to occur at points where the test data has been written at a high recording power of (100+25) % to (100+30) % of the optimum recording power value or higher, and when consideration is given to the actual deviation between the reference recording power value and the optimum recording power value, it has been experimentally confirmed that it is possible to suppress collapse of the track (groove) at points where the test data has been written at a high recording power and to suppress the occurrence of a tracking servo failure when a value of ±20% is used in step S40. Also, the purpose of the present invention being to suppress collapse of the track (groove) at points where the test data has been written at a high recording power and to suppress the occurrence of a tracking servo failure in the case where the optical disc OD is a write-once optical disc provided with three or more recording layers, it is therefore also possible to have a setting which is different from that of the flow chart in FIG. 2 for the lower limit of the recording power value of the optical pickup 3 in the OPC process. Specifically, it is possible to have a similar setting for the lower limit of the recording power value of the optical pickup 3 in the OPC process both in a case where the optical disc OD is a write-once optical disc provided with only one or two recording layers and in a case where the optical disc OD is a write-once optical disc provided with three or more recording layers. It is further possible for no restriction to be applied to the lower limit of the recording power value of the optical pickup 3 during the OPC process in a case where the optical disc OD is a write-once BD provided with three or more recording layers as compared to the case where the optical disc OD is a write-once BD provided with only one or two recording layers.

Accordingly, in the present invention, in a case where the optical disc OD is a write-once optical disc provided with only one or two recording layers for playing back or recording information by being irradiated with a laser beam of a specific wavelength band, the recording power value of the optical pickup 3 is changed within a range from (100−A) % of the reference recording power value corresponding to the recording layer for writing the test data of the optical disc OD, to (100+B) % of the reference recording power value corresponding to the recording layer for writing the test data of the optical disc OD, and in a case where the optical disc OD is a write-once optical disc provided with three or more recording layers for playing back or recording information by being irradiated with a laser beam of a specific wavelength band, the recording power value of the optical pickup 3 is changed within a range from (100−C) % of the reference recording power value corresponding to the recording layer for writing the test data of the optical disc OD, to (100+D) % of the reference recording power value corresponding to a recording layer for writing the test data of the optical disc OD. The A, B, C, and D are all set to values greater than 0 and less than 100, the D being set to be lower than the B. With respect to a rewritable optical disc, too, in the case where the optical disc is a rewritable optical disc provided with three or more recording layers, a restriction may be applied to the upper limit of the recording power value of the optical pickup in the OPC process as compared to the case where the optical disc is a rewritable optical disc provided with only one or two recording layers. In such a case, the A, B, C, and D used with the write-once optical disc may be used without alteration for the rewritable optical disc, or may be set to values different from those for the write-once optical disc.

What is claimed is:

1. An optical disc recording device, provided with:
    an optical pickup for irradiating an optical disc with light and for using a photodetector to detect return light from the optical disc; and
    a determination unit for changing a recording power value of the optical pickup and writing test data onto a test region of the optical disc to determine an optimum recording power for the optical pickup,
    wherein:
    in a case where the optical disc having been mounted in the optical disc recording device is a write-once optical disc provided with only one or two recording layers for playing back or recording information by being irradiated with a laser beam of a specific wavelength band,
    the determination unit changes the recording power value of the optical pickup within a range from (100−A) % of a reference recording power value corresponding to a recording layer for writing the test data of the optical disc mounted in the optical disc recording device, to (100+B) % of the reference recording power value corresponding to the recording layer for writing the test data of the optical disc mounted in the optical disc recording device, and
    in a case where the optical disc mounted in the optical disc recording device is a write-once optical disc provided with three or more recording layers for playing back or recording information by being irradiated with a laser beam of a specific wavelength band,
    the determination unit changes the recording power value of the optical pickup within a range from (100−C) % of the reference recording power value corresponding to the recording layer for writing the test data of the optical disc mounted in the optical disc recording device, to (100+D) % of the reference recording power value corresponding to the recording layer for writing the test data of the optical disc mounted in the optical disc recording device,
    A, B, C, and D all being set to values greater than 0 and less than 100, and D being set to be lower than B.

2. The optical disc recording device according to claim 1, wherein:
    the determination unit refers to disc information, pre-recorded onto the optical disc mounted in the optical disc recording device, when setting the reference recording power value corresponding to the recording layer for writing the test data of the optical disc mounted in the optical disc recording device.

3. The optical disc recording device according to claim 1, wherein:
    the determination unit sets A and B to be the same, and sets C and D to be the same.

4. The optical disc recording device according to claim 2, wherein:
    the determination unit sets A and B to be the same, and sets C and D to be the same.

5. The optical disc recording device according to claim 1, wherein:
- the write-once optical disc provided with only one or two recording layers for playing back or recording information by being irradiated with a laser beam of the specific wavelength band is a BD, and
- the write-once optical disc provided with three or more recording layers for playing back or recording information by being irradiated with a laser beam of the specific wavelength band is a BD conforming to the BDXL standard.

6. The optical disc recording device according to claim 2, wherein:
- the write-once optical disc provided with only one or two recording layers for playing back or recording information by being irradiated with a laser beam of the specific wavelength band is a BD, and
- the write-once optical disc provided with three or more recording layers for playing back or recording information by being irradiated with a laser beam of the specific wavelength band is a BD conforming to the BDXL standard.

7. The optical disc recording device according to claim 3, wherein:
- the write-once optical disc provided with only one or two recording layers for playing back or recording information by being irradiated with a laser beam of the specific wavelength band is a BD, and
- the write-once optical disc provided with three or more recording layers for playing back or recording information by being irradiated with a laser beam of the specific wavelength band is a BD conforming to the BDXL standard.

8. The optical disc recording device according to claim 4, wherein:
- the write-once optical disc provided with only one or two recording layers for playing back or recording information by being irradiated with a laser beam of the specific wavelength band is a BD, and
- the write-once optical disc provided with three or more recording layers for playing back or recording information by being irradiated with a laser beam of the specific wavelength band is a BD conforming to the BDXL standard.

* * * * *